June 21, 1949.  A. B. WELTY  2,474,204
MOISTURE TESTER FOR CONTROLLING RECIRCULATION
OF MATERIAL IN DRYING APPARATUS
Original Filed March 27, 1944  4 Sheets-Sheet 2
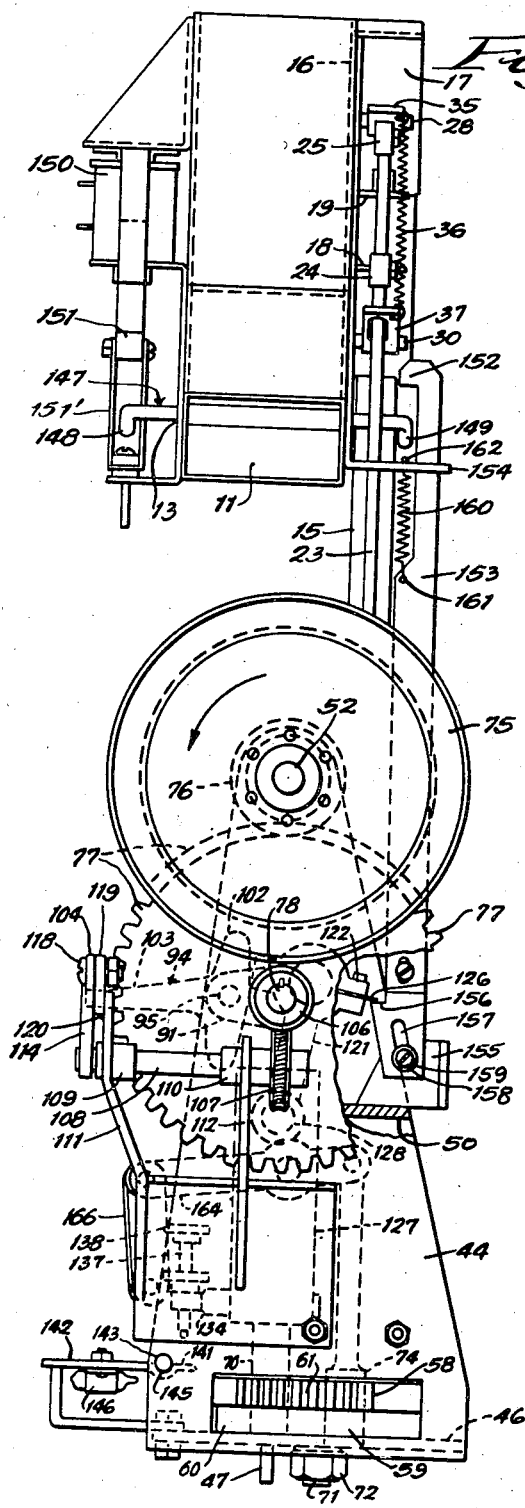
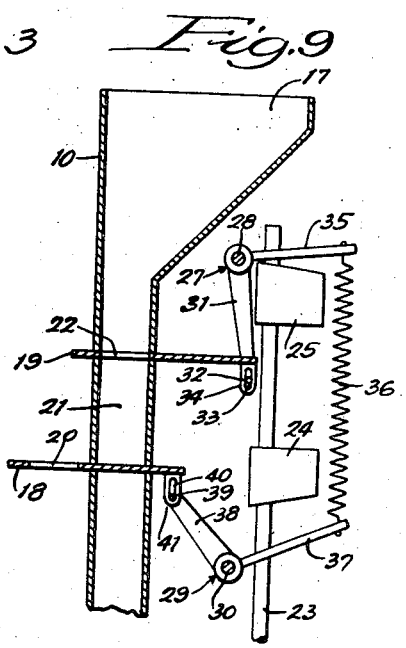
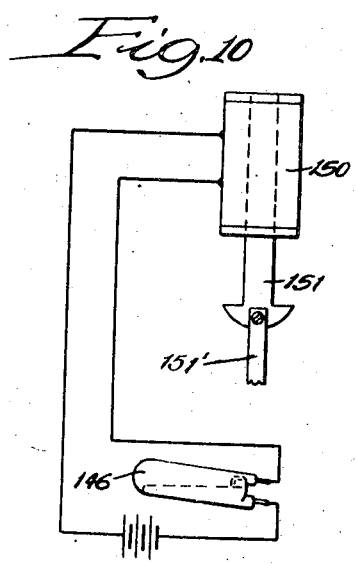
Inventor:
Albert B. Welty,
By Paul O. Pippel.
Attorney.

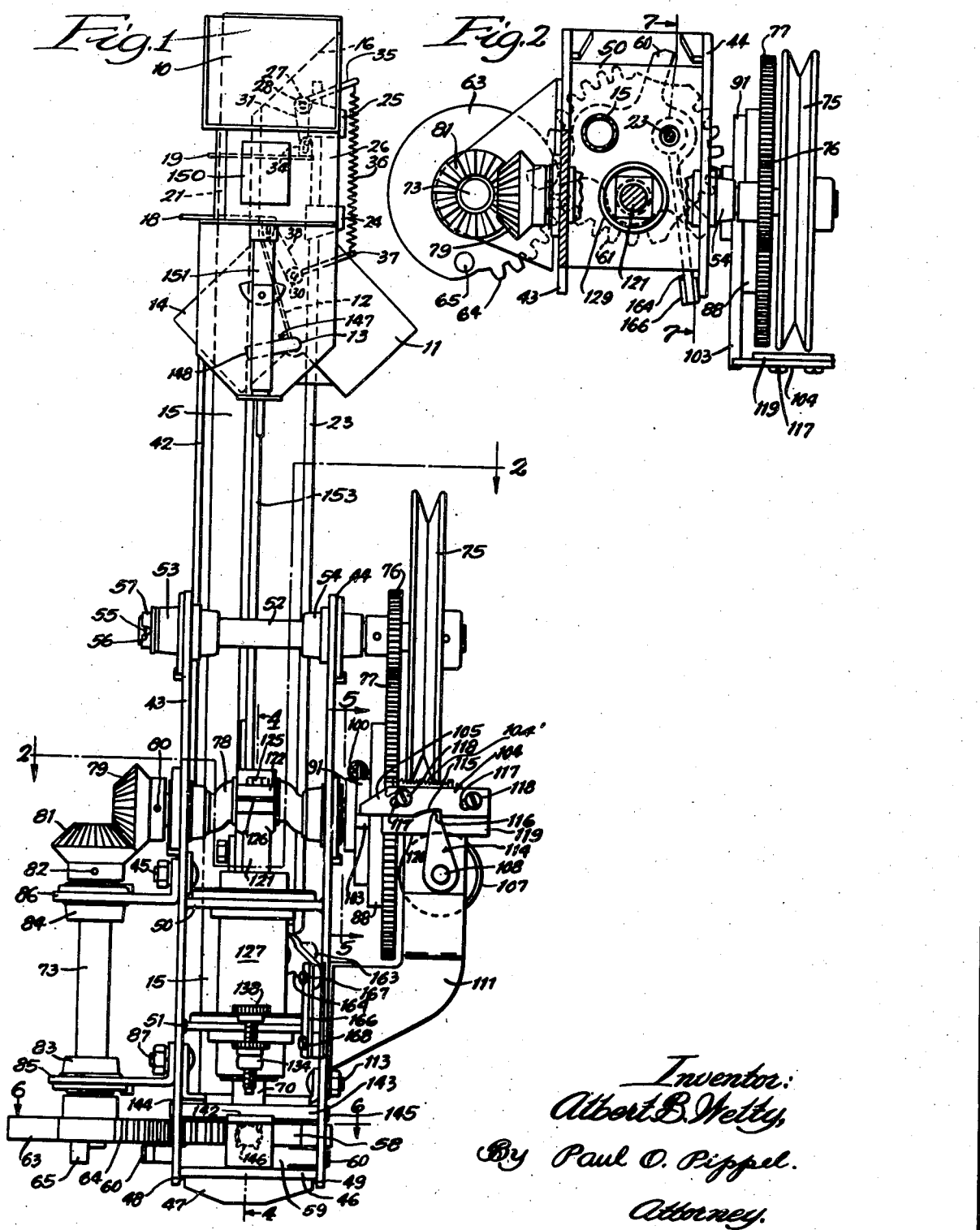

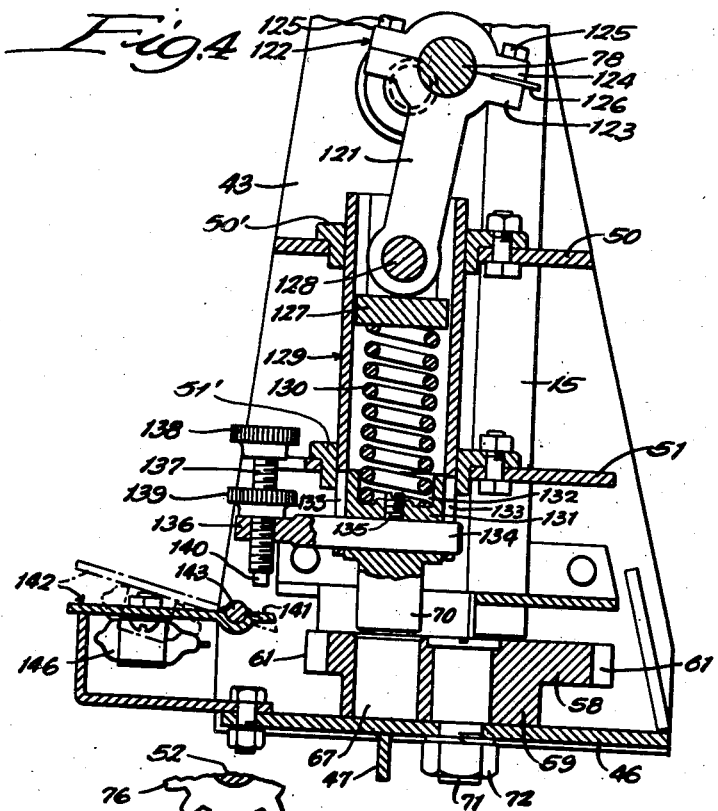
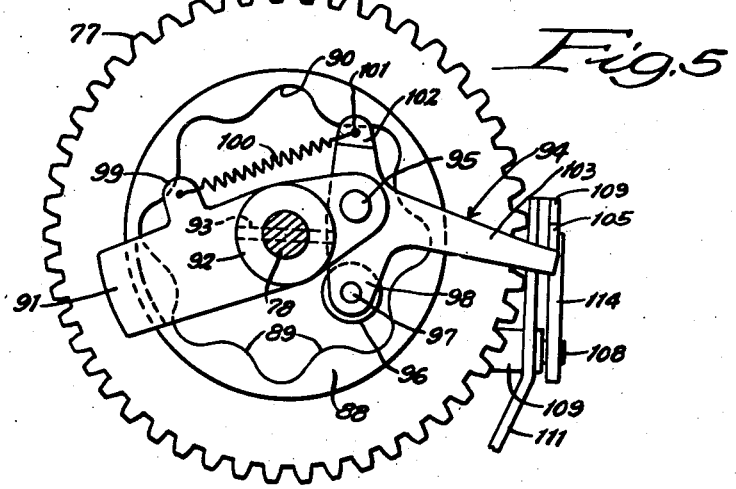

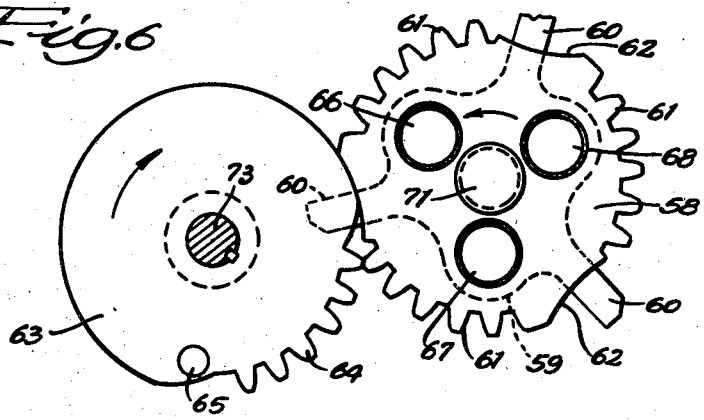

Patented June 21, 1949

2,474,204

UNITED STATES PATENT OFFICE 2,474,204

MOISTURE TESTER FOR CONTROLLING RECIRCULATION OF MATERIAL IN DRYING APPARATUS

Albert B. Welty, Moline, Ill., assignor to International Harvester Company, a corporation of New Jersey Original application March 27, 1944, Serial No. 528,255. Divided and this application June 8, 1945, Serial No. 598,315

3 Claims. (Cl. 34—56)

This invention relates to a new and improved method and apparatus for automatically diverting a stream of grain from a regular discharge spout when a test determines that the moisture contained in a sample of the stream exceeds a predetermined amount.

Preliminary to the storing of corn or other grains or cereals, it is essential that the corn be dried sufficiently so that it has no tendency to spoil. The problem of drying corn is disclosed more fully in my copending application having Serial No. 528,254, now Patent No. 2,410,851 dated November 12, 1946 filed March 27, 1944, and entitled "Grain dehydrator." Drying or dehydrating of moist shelled corn is an important process as it is required that the moisture content of the processed corn upon the completion of the dehydration be not more than a specified maximum. In order to calculate the amount of moisture in kernels of corn, it has been necessary to drive out the remaining moisture by heat and figure the percentage of that moisture by weight. This procedure is very complex and requires a great length of time. When corn is being dried in any type of dehydrator, it is desirable that the dehydrated corn be tested immediatly upon its dehydration. It is not, of course, necessary that all the dehydrated corn be tested but only that samples taken at intervals be tested so as to prevent corn being stored which still contains too much moisture conducive to preservation. If the dehydrating arrangement is such that the corn upon completion is immediately delivered to storage bins, it would be impossible to later separate portions of the corn which were discovered to be too moist upon the running of a moisture test. In other words, the test must be completed immediately so that corn then being issued from the dehydrator may be diverted and run through the dehydrator a second time if the corn is found to be too moist. It will be quite evident, therefore, that testing for moisture by presently used methods will not be conducive to continuous dehydration of a quantity of corn. It is an object of the present invention to overcome the inadequacy of the old methods of testing by a mechanical testing means which is capable of giving an immediate moisture content indication.

This application is a division of my copending application for a "Moisture tester" having Serial No. 528,255 and filed March 27, 1944.

A further important object of this invention is the provision of a mechanical device for determining hardness of kernels of corn or other cereals and having association with a discharge spout from a corn dehydrator so that samples of corn are taken from this discharge spout at regular intervals and fed to the testing device, and, also, corn which is found to be too moist by its lack of hardness is diverted from the regular discharge spout so that it reenters the corn dehydrator.

A still further important object is to provide a method of testing and handling grain in a continuously operating dehydrating plant preliminary to storage of the grain.

Another and still further important object is to provide a device for automatically controlling the maximum amount of moisture content in dehydrated grain which is permitted in grain to be stored in a dry grain receptacle.

Other and further important objects will be apparent from the disclosures in the following specification and accompanying drawings, in which:

Figure 1 is a front elevation of the mechanical moisture tester of this invention;

Figure 2 is a sectional view taken on the line 2—2 of Figure 1;

Figure 3 is a side elevation of the device shown in Figure 1;

Figure 4 is a sectional view taken on the line 4—4 of Figure 1;

Figure 5 is a sectional view taken on the line 5—5 of Figure 1;

Figure 6 is a sectional view taken on the line 6—6 of Figure 1;

Figure 7 is a sectional view taken on the line 7—7 of Figure 2;

Figure 8 is a perspective detail of a portion of the plunger tester;

Figure 9 is an enlarged detail view of the upper portion of the moisture tester device; and Figure 10 is an electrical circuit used in the moisture tester.

As shown in the drawings, the reference numeral 10 indicates generally a discharge conduit from a grain dehydrator, not shown. The conduit 10 normally connects with a discharge spout 11 which feeds to a storage receptacle or bin, not shown. The corn emerging from the dehydrator to the conduit 10 is presumed to be dried sufficiently for storage purposes and hence is allowed to go out through the "dry" spout. A valve or gate 12 is provided within the conduit 10 in such a manner that it may cover the passage to the dry spout 11. This gate member 12 is hinged at 13 and may be in the position shown in Figure 1 where it is closing passage to a spout 14. This spout 14 is known as the "wet" spout. When it has been determined that the moisture content of corn is too high for good preserving characteristics, the valve gate 12 is swung about its hinge 13 so it lies against the spout 11 and causes corn coming down the conduit 10 to be diverted out through the spout 14. The spout 14 feeds the corn back into the dehydrator rather than to a storage bin such as when the corn goes out through the spout 11. The valve 12 is operated automatically as a result of the hardness test carried on in the device shown beneath the two spouts 11 and 14. As previously stated the corn coming down through the conduit 10 normally passes out the dry spout 11, and unless the corn is found to be too wet it continues to exit through this spout 11. Within the conduit 10 is a tube 15 which projects downwardly beyond the spouts 11 and 14. A partition 16 is positioned in the top of the conduit 10 and joins with the tube 15. It will be evident that the dried corn coming down the conduit 10 will have free access to a chamber 17 formed by the partition 16. The corn thus diverted to the chamber 17 will run down into the tube 15. A pair of valve devices is positioned within the tube 15 and consists of sliding gates 18 and 19, respectively. The valve gate 18 projects outwardly beyond the tube 15 and has an aperture 20 therein. The portion of the sliding gate member 18 within the tube 15 is solid and prevents passage of corn. It will be evident that the corn within the chamber 17 travels down to the gate 18 and then proceeds to fill up without letting any of the corn pass down into the lower portion of the tube 15. The portion of the tube 15 between the valve gates 18 and 19 is designated by the numeral 21, and it is that amount of corn between these two valve gates 18 and 19 that is just the right amount of corn necessary to perform a sample test of its hardness. The valve gate 19 is also slidable transversely through the tube 15 and has an aperture 22 corresponding to the aperture 20 in the valve gate 18. The valve gate 19, as shown in Figures 1 and 9, is in its extreme rightward position so that the aperture 22 within the gate is concentric with the tube 15, thus permitting passage of corn within the tube 15. The means for sliding the gates is so arranged that the openings 20 and 22 will never be in alinement within the tube 15 but rather will alternately be open and closed.

An actuator rod 23 carries lugs 24 and 25. The conduit 10 is provided with adequate housing structure 26 upon which is pivoted a bell-crank 27 at 28 and a bell-crank 29 at 30. A depending arm 31 of the bell-crank 27 is equipped with a pin 32 which is adapted to slide within an elongated slot 33 in a bracket 34 mounted rigidly with the valve gate 19. Another arm 35 of the bell-crank 27 is joined by means of a spring 36 to an arm 37 of the bell-crank 29. An arm 38 forms the other portion of the bell-crank 29 and, similar to the arm 31, has a pin 39 which rides within a slot 40 in a bracket 41 forming a part of the valve gate 18. As the bell-cranks 27 and 29 rotate about their pivots 28 and 30, respectively, the sliding gates 19 and 18 are actuated. The actuating rod 23 is shown in its uppermost position wherein the lug 25 has contacted the arm 35 of the bell-crank 27 causing it to move upwardly and pull the sliding valve gate 19 inwardly by means of the depending bell-crank arm 31. The lug 24 on the actuator rod 23 has no function in this position and permits the spring 36 to pull the arm 37 of the bell-crank 29 upwardly. In this position, the sliding gate 18 is forced in a leftward direction. When the rod 23 is pulled downwardly, the lug 25 releases the bell-crank arm 35 permitting it to come down by action of the spring 36. As the rod 23 continues in its downward direction, the lug 24 strikes the bell-crank 37, thus causing the opening 20 in the valve plate 18 to coincide with the tube 15. In this position the quantity of corn within the portion 21 of the tube 15 is permitted to pass downwardly beyond the valve member 18 and into the moisture testing device.

The moisture testing device is positioned beneath the housing structure 26 and is supported thereto by means of a supporting member 42. Spaced apart side plate members 43 and 44 form the frame structure for the main part of the moisture tester. The support 42 is joined to the support 43 by means of a bolt 45 thus holding the entire device in rigid vertical position. The plates 43 and 44 have a bottom member 46 which maintains the spaced apart position of the side plates and forms the rigid block on which the corn hardness testing is performed. A rib 47 reenforces the bottom plate 46. It will be obvious that the plate 46 and rib 47 are welded to the side plates 43 and 44 at 48 and 49. Plates 50 and 51 are welded to the side frame members 43 and 44 and serve to reenforce and maintain the plates 43 and 44 in predetermined spaced apart relationship. The upper ends of the frame members 43 and 44 form a journal support for the shaft 52. Bearings 53 and 54 are mounted integrally with the plates 43 and 44, resepctively, and are in alinement to receive the shaft 52. A pin 55 is affixed within the shaft 52 and projects outwardly beyond the peripheries at opposite sides thereof. The pin engages notches 56 within a collar 57 and prevents the shaft 52 from pulling out of the bearing 43.

Directly above the bottom plate 48 and its reenforcing rib 47 is an intermittent gear of the Geneva type 58, as shown in Figures 1, 3, 4, and 6. The Geneva gear comprises a downwardly projecting disk member 59 which is equipped with three radial arms 60 which are so spaced that they project beyond gear portions 61 of the Geneva gear 58 at concave surfaces 62. The intermittent Geneva gear is journally rotatable on a shaft 71 which is locked in position by means of a nut 72. An adjacent cooperating intermittent gear 63 is adapted to engage the Geneva gear 58. The intermittent gear 63 is keyed for rotation with a shaft 73 and is constantly rotated by means of an external source of power. A gear portion 64 on the intermittent gear 63 forms only a minor portion of the entire gear circumference and is substantially equal to one of the gear portions 61 of the Geneva gear 58. The gear 63 has a downwardly projecting stud 65 which is adapted to be engaged by the radially projecting arms 60 of the member beneath the Geneva gear 58. Upon one complete revolution of the gear 63, the Geneva gear and its integral under portion 59 will rotate one third revolution. The engagement of the stud 65 by the arms 60 makes positive the starting of the Geneva gear by the gear portion 64 of the gear 63.

As best shown in Figure 6, there are three equidistant holes in the surface of the Geneva gear. These holes are denoted by numerals 66, 67, and 68. All these holes extend entirely through the Geneva gear 58 and its depending disk portion 59. However, the bottom plate 46 is solid except for an opening 69 beneath the hole 68. The hole or well 66 is positioned directly beneath the bottom outlet of the sample supply tube 15. It will be noticed that the size of the holes 66, 67, and 68 is substantially equal in diameter to the tube 15, and that the depth of the holes corresponds very closely to the height of the portion 21 between the valve gates 18 and 19. Therefore, when the corn between the valve gates 18 and 19 is permitted to drop in the tube 15, it fills the hole 66. One complete revolution of the gear 63 will advance the hole 66 to the position of the hole 67. However, for purposes of clearer understanding, the hole numbers will be kept the same although it is evident that each hole, during the operation of the machine, takes all three positions. The hole 67 signifies the testing position, and the hole 68 denotes the cleanout position.

The testing hole 67 is shown in greater detail in Figure 4, wherein it is positioned directly beneath a plunger 70. The plunger 70 is adapted to come down and compress the corn within the well 67 upon each revolution of the intermittent gear 63.

The cleanout hole 68 is best shown in Figure 7. The hole 69 in the bottom plate is in alinement with the cleanout hole 68, and they are both in alinement with a cleanout plunger 74. Here again, this plunger 74 is operated upon each revolution of the intermittent driving gear 63.

The driving means for the moisture testing device is secured from some external power supply and is adapted to impart rotation to a pulley 75. The pulley 75 is fastened to the shaft 52 journaled on the supporting plates 43 and 44. A gear 76 is keyed or otherwise fastened to the shaft 52, and upon rotation of the pulley 75, it also rotates. The gear 76 cooperates with a gear 77 positioned therebeneath and which is journaled for free rotation on a crank-shaft 78 also journaled on the frame members 43 and 44. A bevel gear 79 is fastened to a projecting end of the crank-shaft 78 by means of a pin or the like 80. This bevel gear 79 cooperates with a bevel gear 81 which is fastened to the shaft 73 by means of a pin 82. The shaft 73 is journally supported in bearings 83 and 84 which are in turn supported by brackets 85 and 86, respectively. The bracket 86 is attached to the supporting plate 43 by means of the bolt 45, and the bracket 85 is attached to the frame plate 43 by means of a bolt 87. Rotation of the crank-shaft 78 causes rotation of the intermittent gear 63.

The gear 77 is equipped with an annular flange 88 of a smaller diameter than that of the gear. The internal periphery of the flange 88 is provided with arcuate or scalloped ratchet teeth 89 and opposite alternate depressions 90. An arm 91 having a hub 92 is fastened to the crank-shaft 78 by means of a pin 93. A pawl member 94 is pivoted at 95 on the arm 91. A roller member 96 rotatable about a pin 97 projecting from an arm 98 on the pawl 94 is adapted to engage the arcuate depressions 90 between the ratchet teeth 89. The arm 91 has a projection 99 to which is attached a spring 100. The other end of the spring is fastened at 101 to an upwardly extending arm 102 of the pawl member 94. The arms 98 and 102 of the pawl member 94 are diametrically opposed across the pivot shaft 95. The action of the spring 100 normally tends to cause engagement of the pawl wheel 96 with the ratchet teeth. A third arm 103 on the pawl 94 projects outwardly beyond the periphery of the gear 77 and is either restrained or permitted rotational movement about the shaft 95. The spring 100 tends to cause a counter-clockwise rotation of the arm 103, as viewed in Figure 5. Viewing the device in Figure 1, the arm 103 is pulled upwardly by the spring 100. A slidable plate 104 has an end 105 which engages the top of the arm 103, thereby preventing upward movement of this arm. In such position, the gear 77 rotates without transmitting its rotation to the crank-shaft 78.

A worm 106 is welded or otherwise fastened to the outer surface of the gear 77, as shown in Figure 3. Inasmuch as the gear 77 constantly rotates with the drive pulley 75, the worm 106 will also rotate. A worm wheel 107 is fastened to a shaft 108 and is driven by cooperative engagement with the worm 106. The shaft 108 is journaled in bearings 109 and 110 in supporting brackets 111 and 112, which are attached to the frame member 44 by means of bolts 113. A trip member 114 is fastened to the end of the shaft 108 and continuously rotates in a clockwise direction, as viewed in Figure 1. The sliding stop plate 104 has a cut-out notch 115 which is engageable by an outer extension 116 of the trip member 114. It will be evident that upon each rotation of the trip member 114, this outer extension 116 will slide the plate 104 outwardly by its contact with the notch 115. This sliding is permitted by inclined slots 117 in the plate 104 through which bolts 118 pass and thereupon engage a stationary member 119 which is welded or otherwise attached to the bracket 111 as at 120. The outward and upward movement of the slidable plate 104 withdraws its locking extension 105 from position above the arm 103 of the pawl 94.

The pawl 84 is now permitted to rotate about its pivot 95 upon action of the spring 100. The pawl roller 96 then engages the rotating scalloped ratchet teeth 89-90 and acts as a clutch to transmit rotation of gear 77 through the pawl 94 and thereupon to the arm 91. Rotation of the crank-shaft 78 is the result of this tripping and clutching operation. The crank-shaft is permitted one revolution, at which time the arm 103 of the pawl 94 again comes into contact with the stop 105 of the plate 104 and prevents further rotation. After the trip arm 114 has rotated beyond contact with the notch 115 in the plate 104, the plate will slide back into its original locking position, as shown in Figure 1. The means for returning the plate 104 to locking position is effected by a spring 104', but in the application as shown the inclined slots 117 would permit the plate to return to its original position by gravity. The worm-driven trip 104 is in effect a timing device which causes actuation of the moisture-testing device at predetermined regular intervals. The exact time period will, of course, depend upon the gear ratios, and, as shown in the drawings, the trip arm 114 is set to operate at approximately every 90 seconds.

A pitman 121 has split sleeve portions extending around the crank-shaft 78 as shown at 122 in Figure 4. The shaft 78 is journaled for rotation within the split sleeve portions. The sleeve device consists of flanged C-shaped members 123 and 124 having their flanges fastened together by means of bolts 125. Between these clamp flanges 123 and 124 is positioned a trip finger 126, which projects outwardly to one side thereof as best shown in Figures 3 and 4. The crank-arm 121 is pivotally attached to a tubular sleeve 129 by a shaft 128. The tubular sleeve 129 surrounds a disc member 127 which is welded therewithin. The sleeve and unitary disc 127 are mounted for vertical sliding movement within the alined bearings 50' and 51' in the frame plates 50 and 51, respectively. The shaft 128 extends through the peripheral walls of the sleeve 129 and, as a result thereof, insures reciprocal movement of the sleeve upon movement of the crank-shaft. This tubular member 129 houses a precompressed spring 130 directly beneath the disc 127 which telescopically extends the upper portion 131 of the plunger member 70. The members 129 and 131 are movable with respect to each other within predetermined limits. The portion 131 is cup-shaped as at 132 for reception of the lower portion of the spring 130. A downward movement of the sleeve unit 129 by rotation of the crank-shaft 78 will effect an attempted compression of the spring 130 and/or a downward movement of the plunger 70. The precompression of the spring 130 supplies the plunger with an initial acting force of the amount of precompression. The test well 67 is filled with dehydrated kernels of corn, and travel of the plunger 70 within this well 67 depends upon the hardness of the corn. It is quite evident, therefore, that the strength of the spring 130 is of importance in effecting a proper amount of pressure on this dehydrated corn. If a relatively weak spring is employed, then the resultant pressure on the corn in the test cup 67 is small, and, conversely if a strong spring is used, then the pressure on the corn within this test cup is proportionately greater.

The tubular sleeve 129 has diametrically opposed vertical slots 133 through which is positioned a rod 134. The rod passes through the portion 131 of the plunger 70 and is held in position therein by a set screw 135. The rod 134, therefore, moves with the plunger 70 and provides the separable limit means between the plunger and sleeve by movement of the rod within the slots 133. One end of this rod 134 extends considerably beyond the wall of the tube 129 and comprises a flattened portion 136. An adjustable threaded screw 137 passes through a threaded aperture in the flat portion 136 of the rod 134. The head of a screw 138 and a lock nut 139 are adjustable to and from the upper surface of the flattened portion 136 of the cross rod 134. The lower end of this screw 137 has a depending trip 140 which is capable of contacting an end 141 of a hinged member 142. The member 142 is hinged on a rod 143 which is journaled in opposed apertures 144 and 145 in the supporting side plates 43 and 44. In addition, this hinged member 142 carries a mercury switch 146 which upon being mechanically tilted is adapted to close an electrical circuit as shown in Figure 10. The precompressed spring 130 and adjustable trip 140 together give the plunger 70 an adjustable predetermined force for compressing samples of grain and thereupon always actuating the electric switch after a similar compression upon the application of the same amount of pressure.

The diverter valve gate 12, which controls flow of corn to either spout 11 or 14, is operable by means of a U-shaped member 147 having arms 148 and 149. Closing of the electrical circuit by the mercury switch 146 actuates a solenoid 150. A core 151 of the solenoid 150 extends downwardly to a position immediately above the arm 148 of the valve actuator. A downwardly extending bail or stirrup member 151' forms a part of the reciprocating core 151. The arm 148 of the U-shaped actuator projects within the bail 151', and upen energizing the coils of the solenoid 150 it will be apparent that the core 151 and its unitary stirrup 151' upon receding within the solenoid 150 will draw the arm 148 upwardly. Such a movement causes the valve gate 12 to shift its position to close the entrance to the dry spout 11 and divert all corn coming down through the conduit 10 out through the spout 14. It will be understood, of course, that this results only when compression of the corn in the test wall 67 is of such an extent that the projection 140 tilts the hinged member 142 sufficiently to make contact within the mercury switch 146. The corn from the wet spout is then put through the dehydrator or dryer again to effect a more complete drying. However, if the corn is hard enough to withstand the force of the spring 130 and prevent the plunger 70 from entering the well 67 to any great extent, the electrical circuit will not be closed, the solenoid 150 will not act, and as a result thereof, corn will continue to flow out of the dry spout.

It has been determined that the hardness of corn bears a definite relationship to its moisture content. Hence, the amount of moisture in corn may be calibrated with respect to the amount of compression. If it is sufficient to have the corn emerge from the dryer with fourteen per cent moisture, then the adjusting screw 137 is set at such a position that it will not actuate the mercury switch 146 until corn having a moisture content of over fourteen per cent is in the test cup 67. It will be seen, therefore, that as long as the plunger 70 is not able to compress the corn to a greater extent than that allowed by the adjustable screw 137, corn will continue to emerge from the dry spout 11. The other arm 149 of the valve actuator member 147 is controlled by a projection 152 of a vertically reciprocable rod 153. The rod 153 is guided by means of brackets 154 and 155. The lower end of the rod 153 is equipped with a ledge-like projection 156 and an elongated inclined slot 157. A bolt 158 is fastened to the bracket 155, projects through the slot 157, and is held therein by the enlarged head portion 159 of the bolt 158. A spring 160 is attached to the rod 153 at 161 and to the bracket 154 at 162 and normally tends to maintain the rod 153 in its uppermost position as limited by the lower end of the elongated slot 157. Rotation of the crank-shaft 78 and corresponding rotation of the trip finger 126 causes the arm 153 to move downwardly and slightly outwardly at the bottom thereof by raising of the trip finger 126 striking the projecting ledge 156 of the rod 153. It will be seen that upon each revolution of the crank, the rod 153 will be pulled downwardly. As soon as the trip finger 126 leaves the ledge 156, the spring 160 causes the rod 153 to rise. As long as the valve gate 12 is in its position, as shown in Figure 1, the actuator arms 148 and 149 will both be in a downward position, as shown in Figures 1 and 3. Hence, a downward movement of the rod 153 performs no function whatsoever. However, if the compressing of the corn discloses that its moisture content is too high, the operation of the solenoid 150 will have pulled the valve actuator arm 148 upwardly, and inasmuch as the arm 149 is an integral part of the arm 148 it also will be in an upward position. In this position, it will be remembered, the corn is coming out of the so-called wet spout 14, and upon operation of the regular test, the rotation of the crank-shaft 78 will effect a downward movement of the rod 153 and a pulling down of the valve actuator arm 149 to open the dry spout 11 and close the wet spout 14. Another test is then made by a reciprocation of the plunger 70, and if the corn is again moist, operation of the solenoid 150 will occur and cause the corn to be again diverted to the wet spout 14. However, if the corn is at this time sufficiently dry, it will continue to pass out of the dry spout 11.

Upon each revolution of the crank-shaft 78 as permitted by the internal pawl and ratchet clutch, the intermittent gear 63 will be rotated one revolution. Each revolution of the intermittent gear 63 causes a one-third revolution of the intermittent Geneva gear 46. The device is so timed that after the teeth 64 on the gear 63 cease moving the gear 66, a sample of corn will fill the well 66 from its storage in the tube 15 within the area 21 confined by the sliding valve members 18 and 19. Simultaneously, the plunger 70 is caused to come down within the test well 67. A third function also simultaneously performed is the cleanout of the well 68. The operation of the cleanout is best shown in Figure 7. The sleeve 129 has welded thereto a stub-shaft 163. A lever arm 164 is shown journally pivoted on this shaft 163 in Figure 7. One end of this arm 164 pivotally supports the upper end of the cleanout plunger 74 at 165. The other end of the arm 164 is pivoted to a hinged arm 166 at 167, and it will be evident that upon reciprocable movement of the sleeve 129, the shaft 163 will cause a hinging of the arm 164 about its pivot 167. The arm 166 is hinged at 168 to a bracket 169 welded or otherwise fastened to the frame plate 51. Therefore, upon downward movement of the shaft 163, the cleanout plunger 74 travels downwardly through the open-bottomed well 68—69. The well 68 is then ready to be refilled after its rotation to the position 66 shown in Figure 6. The rod 23, which effects movement of the sampler valves 18 and 19, is connected at 170 to the outer end of the cleanout plunger 74, and, therefore, when the cleanout plunger moves downwardly, the rod 23 likewise moves downwardly effecting a closing of the valve plate 19 and an opening of the valve plate 18 to thereby drop the sample charge down the tube 15 into the well 66.

It is obvious that numerous types of apparatus may be employed in effecting a hardness test which will indicate moisture contained in the grain. Further the method of testing and handling the grain prior to storing is believed to be a departure from practices heretofore followed and for that reason claims have also been directed toward the method as well as the mechanical tester.

The invention is to limit the invention only within the scope of the appended claims.

What is claimed is:

1. In a moisture testing device for grain, comprising means for mechanically testing by compression at regular time intervals samples of continuously pouring grain, a rotatable block having a plurality of wells therein, means for feeding grain to one of said wells, means for compressing grain in another of said wells, means for cleaning out another of said wells, a pair of spouts adapted to allow passage of the grain, a diverter valve positioned between said spouts so that grain may only go out either one or the other spout, and means associated with the mechanical testing device for operating said diverter valve.

2. In a moisture testing device for grain, comprising means for mechanically testing by compression at regular time intervals samples of continuously pouring grain, a rotatable block having a plurality of wells therein, means for feeding corn to one of said wells, means for compressing corn in another of said wells, means for cleaning out another of said wells, a pair of spouts adapted to allow passage of the shelled corn, a diverter valve positioned between said spouts so that shelled corn may only go out either one or the other spout, and means associated with the mechanical testing device for operating said diverter valve.

3. In combination with a moisture tester for cereals and the like material having periodically operating movable means to compress a sample thereof taken periodically from a source of continuously flowing stream of material coming from a drier, a pair of diverging spouts positioned to route said stream of material including a movable diverter valve operable between the spouts to cause the material to flow through one spout or the other depending upon the position of said valve, means connected with the valve to operate the same, and means automatically responsive to a predetermined degree of movement of said movable compressing means to actuate said valve operating means, whereby when the sample is compressed sufficiently to indicate too high a moisture content for safe storage the diverter valve routes the material for additional drying.

ALBERT B. WELTY.

REFERENCES CITED

The following references are of record in the file of this patent:

UNITED STATES PATENTS

| Number | Name | Date |
|--------|------|------|
| 999,706 | Eichler et al. | Aug. 1, 1911 |
| 1,341,676 | Robert | June 1, 1920 |
| 1,740,075 | Dalton | Dec. 17, 1929 |